United States Patent [19]

Berlenbach et al.

[11] 4,209,395
[45] Jun. 24, 1980

[54] PROCESS FOR SLOW SOFTENING WATER

[75] Inventors: Norbert Berlenbach, Wiesbaden-Dotzheim; Ferdinand Klegraf, Wiesbaden, both of Fed. Rep. of Germany

[73] Assignee: Passavant-Werke Michelbacher Huette, Fed. Rep. of Germany

[21] Appl. No.: 942,958

[22] Filed: Sep. 18, 1978

Related U.S. Application Data

[63] Continuation-in-part of Ser. No. 808,125, Jun. 20, 1977, abandoned, which is a continuation-in-part of Ser. No. 666,680, Mar. 15, 1976, abandoned.

[30] Foreign Application Priority Data

Mar. 19, 1975 [DE] Fed. Rep. of Germany ......... 251210

[51] Int. Cl.² .......................... C02B 1/20; C02B 1/22
[52] U.S. Cl. ......................................... 210/46; 210/53
[58] Field of Search .................. 210/42 R, 45, 46, 47, 210/51–53, 59, 60

[56] References Cited

U.S. PATENT DOCUMENTS

| | | | |
|---|---|---|---|
| 1,653,272 | 12/1927 | Green et al. | 210/46 |
| 1,984,219 | 12/1934 | Krogh-Lund | 210/51 |
| 2,044,583 | 6/1936 | Rankin | 210/46 |
| 2,044,584 | 6/1936 | Rankin | 210/53 |
| 2,348,122 | 5/1944 | Green | 210/53 |
| 2,359,748 | 10/1944 | Clemens | 210/45 |
| 2,428,418 | 10/1947 | Goetz et al. | 210/46 |
| 3,087,889 | 4/1963 | Goudriaan | 210/46 |
| 3,089,789 | 5/1963 | Van Note | 210/46 |
| 3,839,199 | 10/1974 | Weiss et al. | 210/46 |
| 4,036,749 | 7/1977 | Anderson | 210/45 |

*Primary Examiner*—Charles N. Hart
*Assistant Examiner*—Peter A. Hruskoci
*Attorney, Agent, or Firm*—Woodford R. Thompson, Jr.

[57] ABSTRACT

Water having calcium compounds therein is softened by admixing an alkaline precipitating agent and finely divided crystalline calcium carbonate therewith in a mixing zone prior to the addition of a flocculating agent containing trivalent metal ions whereupon the calcium compounds are then changed inside a reaction zone into calcium carbonate. At least a part of the calcium carbonate newly precipitated from the water in the reaction zone prior to addition of the flocculation agent is immediately withdrawn and recycled to the mixing zone.

2 Claims, 2 Drawing Figures

PROCESS FOR SLOW SOFTENING WATER

CROSS REFERENCE TO RELATED APPLICATION

This application is a continuation-in-part application of our prior copending application filed June 20, 1977, Ser. No. 808,125, now abandoned which is a continuation-in-part application of our prior application filed Mar. 15, 1976, Ser. No. 666,680 now abandoned.

BACKGROUND OF THE INVENTION

This invention relates to a process for slow softening water as distinguished from water softening which takes place under pressure inside a reactor. As is well known in the art, slow softening of water is a method for removing the temporary hardness of water by admixing the water with an alkaline compound, usually $Ca(OH)_2$ or possibly NaOH or $Na_2CO_3$, passing the water through a reaction zone wherein the various calcium carbonates present in the water, in particular soluble $Ca(HCO_3)$, are changed into insoluble $CaCO_3$, contacting such compounds with a flocculating or precipitating agent containing trivalent metal ions, such as $FeCl_3$, and settling the flocs thus produced in a sedimentation zone or separating such flocs by means of a sand filter.

A very difficult problem encountered with the known slow softening process lies in the fact that the reaction must be completed before the liquid leaves the reaction zone. That is, the total amount of calcium which can be precipitated must be changed into calcium carbonate so as to be completely flocculated and precipitated in the following stages. Otherwise, precipitation and scaling will occur inside pipes, ducts, heaters or other plant equipment through which the liquid subsequently passes. In known slow softening systems satisfactory reaction will occur only if the temperature of the liquid to be softened is greatly increased or if, for precipitation of calcium carbonate from supersaturated solutions, the aforementioned introduction of salts containing trivalent metal ions is combined with a retention time of several hours inside the flocculation and sedimentation zones. But even under these conditions and even if a series of successive flow-through, completely mixed reaction stages are used, it may occur, especially at temperatures below 5°C., that reaction is incomplete and the calcium carbonate remaining in solution will later precipitate and scale in subsequent systems, pipes and ducts.

SUMMARY OF THE INVENTION

An object of the present invention is to provide, by simple means, an improved method of slow softening water which considerably reduces total treatment time and achieves complete reaction, precipitation and removal of calcium carbonate. In accordance with our invention, before entering the reaction zone and before being contacted with the flocculation agent, the water being softened is admixed with finely divided crystalline calcium carbonate. Preferably, the admixture takes place in a mixing zone simultaneously with the addition of an alkaline compound.

The admixed finely divided crystalline calcium carbonate acts as an inoculant or seeding agent which accelerates restoration of the equilibrium in the reaction zone, whereby a fast and satisfactory reaction takes place before the salts containing trivalent metal ions are added to the liquid. Our improved softening process lends itself as a particularly advantageous and inexpensive source of calcium carbonate. That is, a portion of the calcium carbonate which is formed in the reaction zone is caused to settle within or downstream of the reaction zone but prior to the addition of the salts containing trivalent metal ions. This portion of calcium carbonate is then recycled to the inlet end of the reaction zone or into the mixing stage. Additional calcium carbonate, such as particulate marble, will only be needed to start up the process. The fine particulate crystalline calcium carbonate and/or the alkaline compound are preferably added to a deflected portion of the incoming stream of raw water, and after this operation the deflected portion of the liquid stream is fed back into the main stream. In this improved manner it is possible to feed stoichiometrically exact dosages corresponding to relatively low concentrations. The alkaline compound added may be $Ca(OH)_2$ in the form of limewater (solution) or lime-milk (suspension). As another advantageous alternative CaO (unslaked lime) may be added directly to the incoming raw liquid, such as by adding CaO to a deflected portion of a stream thereof, whereby $Ca(OH)_2$ is thus obtained, slaking of lime is avoided, the volume of the material added is reduced and the temperature increase resulting from the exothemic reaction produces desirable results.

The process according to our invention provides for essentially complete reaction within the reaction zone and thus prevents calcium carbonate scaling in subsequent treatment stages of the plant, therefore the flocs obtained by the addition of a flocculating or precipitating agent containing trivalent metal ions may be caused to settle beyond the flocculation stage in high-rate sedimentation apparatus, such as conventional, inclined sedimentation plates or tubes.

DESCRIPTION OF THE DRAWINGS

The invention is discussed more in detail in the following, reference being made to the accompanying drawings, in which.

DETAILED DESCRIPTION

Figure 1:
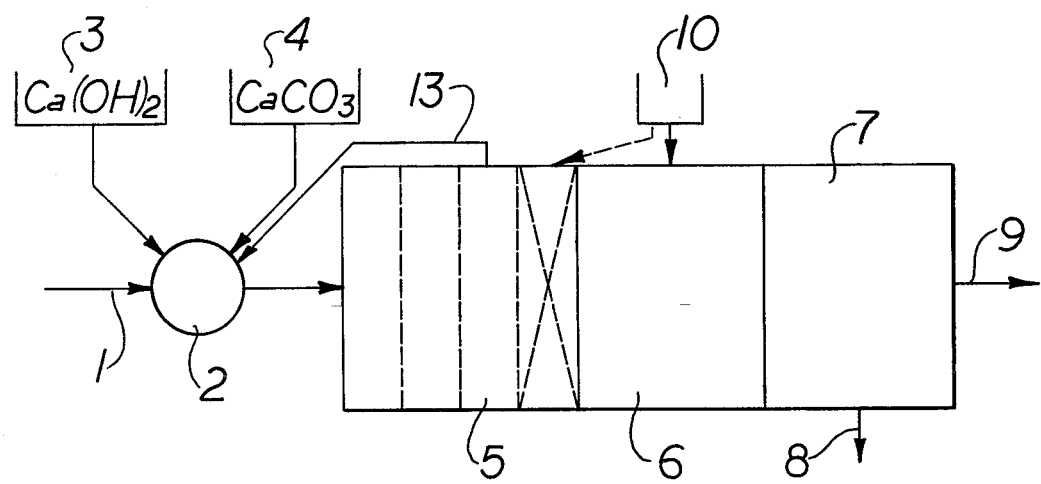
FIG. 1 is a flow diagram showing one emdobiment of the process according to the invention; and, FIG. 2 is a flow diagram showing another embodiment of the process.

Referring now to FIG. 1, the raw water entering at 1 is fed into a cyclone mixer 2 in which it is admixed with lime-milk from a container 3 and with finely divided crystalline calcium carbonate, such as particulate marble, from a container 4. The water being softened is then caused to enter a reaction zone 5 comprising a series of successive reaction stages, wherein the liquid is thoroughly mixed. While we show four such reaction stages, it will be apparent that the number of stages may be varied. Water being softened passes into a flocculation zone 6 where it is contacted with a flocculation agent in the form of one or more salts containing trivalent metal ions, such as $FeCl_3$, with the flocculant being supplied from a container 10. If desired, the flocculant may be dosed into the last of the successive reaction stages in the reaction zone 5. Just before flocculant is added from container 10, at least a portion of the calcium carbonate formed in the reaction zone 5 is immediately presettled and withdrawn as a sediment and returned by a conduit 13 to the mixer 2. After starting up the process, all of the calcium carbonate is then supplied to the mixer 2 by conduit 13 rather than being supplied from container 4. After a retention time sufficiently long for the formation of flocs, the water being softened is admitted to a sedimentation or filtration zone 7, where the flocs settle out to form a sludge consisting mainly of $CaCO_3$, $Fe(OH)_3$ and possibly $Al(OH)_3$ and other compounds. the sludge is withdrawn at 8 while the softened water is discharged at 9 and may then be fed to further treatment systems, such as a conventional sand filter. The flocculation zone 6 and the sedimentation or filtration zone 7 may be in the form of tanks having conventional internal structures therein to improve flow conditions. Also, the sedimentation or filtration zone 7 may consist of a high-rate sedimentation unit, having a conventional plate or tube separator, with the water flowing through according to the concurrent or countercurrent principle.

It has been found that the addition of finely divided crystalline $CaCO_3$ even in quantities as small as 5 $g/m^3$, but preferably in excess thereof, combined with the addition of calcium hydroxide in the feed concentrations ranging from 0.5 to 2 g/l (grams per liter) will result in considerably reduced reaction and flocculation times. Accordingly, total reaction, flocculation and precipitation throughout the system may be obtained during retention times totaling far less than one hour. These results compare very favorably with those obtained in known processes, in which, especially at low temperatures, retention times of several hours or even days are customary.

Figure 2:
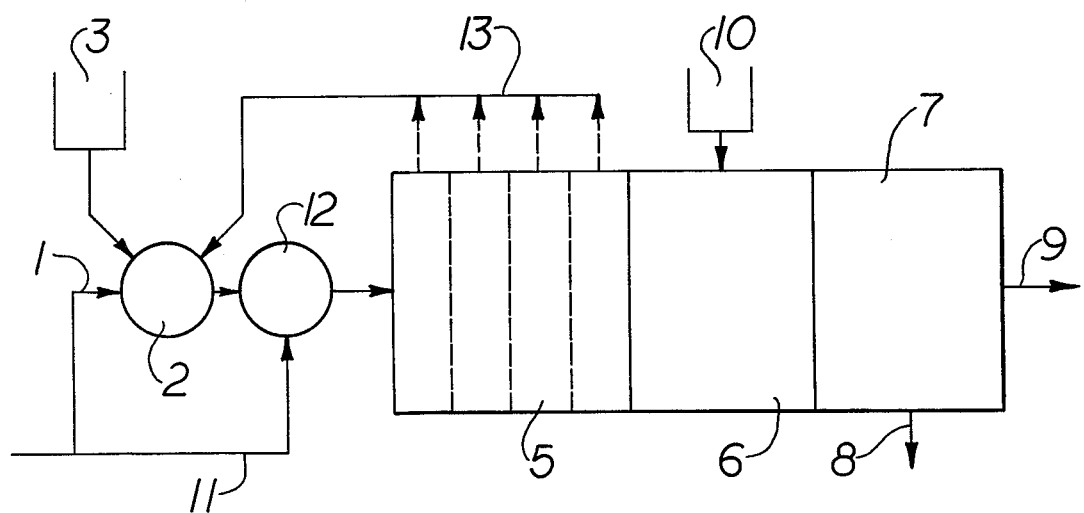

In the embodiment shown in FIG. 2 only a portion of the incoming liquid stream is admitted to the cyclone mixer 2, lime-water or lime-milk being added thereto from the container 3. That is, a portion of the main liquid stream 11 is deflected to the mixer 2 with the main liquid stream 11 bypassing the cyclone mixer 2 to be mixed or blended again with the deflected stream in a mixer 12. The mixed liquid then passes successively through the multistage reaction zone 5, the flocculation zone 6 where the flocculant is added from container 10, and then through the sedimentation or filtration zone 7. Before flocculant is added from container 10, calcium carbonate having formed in the last stage of the reaction zone 5, and possibly in previous stages, is immediately presettled and withdrawn as a sediment and returned via conduit 13 to the cyclone mixer 2. The stream of liquid deflected from the main stream is thus continuously admixed with crystalline calcium carbonate produced in the process itself. An initial addition of calcium carbonate such as particulate marble, is required only for starting up the process. Such an initial addition of calcium carbonate may come from a suitable source, such as from the container 4 shown in FIG. 1.

Obviously, dosing of additives into a deflected portion of the main stream of raw water can also be realized in the embodiment shown in FIG. 1.

As a variation to both the embodiments described hereinabove, the raw water is not mixed with lime-water or lime-milk but with solid $Ca(OH)_2$ or solid $CaO$ (unslaked lime) in the form of either finely or coarsely granulated particles directly dosed into the cyclone mixer 2. If solid CaO particles are added, the alkaline calcium hydroxide required in the reaction zone is formed within the water itself, thus resulting in the aforementioned favorable conditions.

In all of the embodiments the zone 7 may well be a sedimentation zone or a filtering zone, for instance in the form of a conventional sand filter.

The reaction zone 5 which usually comprises a series of successively arranged mixing tanks or containers may be equipped with conventional devices for the withdrawal of the previously precipitated calcium carbonate which is then recycled into the process through conduit 13. Also in the embodiment of FIG. 2 the reaction zone 5 may be a conventional high-rate sedimentation unit. Recycling the calcium carbonate produced in the process through conduit 13 enables dosage of finely crystalline calcium carbonate into the raw liquid with concentrations ranging from 200 to 500 $g/m^3$, whereby conditions in the reaction zone are effectively and rapidly equilibrated and reaction is fully completed inside the reaction zone. Retention times range well below one hour even at low temperatures.

While we have shown our invention in two forms, it will be obvious to those skilled in the art that it is not so limited, but is susceptible of various changes and modifications without departing from the spirit thereof.

What we claim is:

1. In a process for slow softening raw water having soluble calcium compounds present therein, wherein at least one alkaline precipitating agent is admixed with the water to be softened in a mixing zone and then the calcium compounds are changed inside a reaction zone through which the water passes after being admixed with the alkaline precipitating agent into insoluble calcium carbonate matter which is subsequently changed in a flocculation zone into settleable flocs by the addition of a flocculating agent containing trivalent metal ions, the improvement comprising:
    (a) mixing the raw water in addition to said alkaline precipitating agent with at least 5 $g/m^3$ of finely divided crystalline calcium carbonate in said mixing zone prior to the addition of and in the absence of said flocculation agent to form seeds for said calcium carbonate matter which newly precipitates from the raw water inside said reaction zone,
    (b) immediately presettling and discharging at least a part of the insoluble calcium carbonate matter which has been precipitated inside said reaction zone, and
    (c) recycling said part of the presettled and discharged insoluble calcium carbonate matter to said mixing zone as said seeds for the precipitation in said reaction zone.

2. A process as defined in claim 1 in which the water is introduced into a sedimentation zone after said water has been mixed with the flocculating agent and has passed through the flocculating zone.

* * * * *